(12) United States Patent
Kairali et al.

(10) Patent No.: US 12,284,244 B2
(45) Date of Patent: Apr. 22, 2025

(54) SMART SWITCHING IN EDGE COMPUTING

(71) Applicant: International Business Machines Corporation, Armonk, NY (US)

(72) Inventors: Sudheesh S. Kairali, Kozhikode (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 169 days.

(21) Appl. No.: 18/172,577

(22) Filed: Feb. 22, 2023

(65) Prior Publication Data

US 2024/0283843 A1 Aug. 22, 2024

(51) Int. Cl.
*H04L 67/101* (2022.01)
*H04L 67/1008* (2022.01)

(52) U.S. Cl.
CPC ........ *H04L 67/101* (2013.01); *H04L 67/1008* (2013.01)

(58) Field of Classification Search
CPC .......................... H04L 67/101; H04L 67/1008
See application file for complete search history.

(56) References Cited

U.S. PATENT DOCUMENTS

| | | |
|---|---|---|
| 8,538,912 B2 | 9/2013 | Simitsis et al. |
| 11,048,716 B1* | 6/2021 | Cseri ...................... G06N 20/00 |
| 11,144,566 B2 | 10/2021 | Dhayapule et al. |
| 2016/0019564 A1* | 1/2016 | Ouyang ........... G06Q 10/06315 705/7.31 |
| 2019/0303380 A1 | 10/2019 | Hyde et al. |
| 2019/0379589 A1* | 12/2019 | Ryan ..................... G06F 17/142 |
| 2020/0026710 A1 | 1/2020 | Przada et al. |
| 2020/0327371 A1* | 10/2020 | Sharma .................. H04L 67/34 |
| 2020/0351336 A1* | 11/2020 | Campbell .......... H04L 67/1008 |

OTHER PUBLICATIONS

Anonymous, "Dynamic Switching of ETL Jobs", IPCOM000260813D, IP.com, Dec. 24, 2019, 3 pages.

* cited by examiner

*Primary Examiner* — Oscar A Louie
*Assistant Examiner* — Ranjan Pant
(74) *Attorney, Agent, or Firm* — CANTOR COLBURN LLP; Tihon Poltavets

(57) ABSTRACT

A computer-implemented method for distributing packets for smart switching is provided. The computer-implemented method includes checking whether an edge device will complete a task relative to a data warehouse while having networking availability, deciding to proceed with the task using an extract, transform, load (ETL) strategy based on a determination that the edge device will complete the task while having the networking availability, checking whether the edge device will complete data extraction of the task while having the networking availability based on a determination that the edge device will not complete the task while having the networking availability and deciding to proceed with the data extraction using an extract, load, transform (ELT) strategy based on a determination that the edge device will complete the data extraction of the task while having the networking availability.

17 Claims, 6 Drawing Sheets

SMART SWITCHING IN EDGE COMPUTING

BACKGROUND

The present invention generally relates to edge computing, and more specifically, to a smart switching system for edge computing.

Edge computing is a distributed computing paradigm that brings computation and data storage closer to the sources of data. Edge computing can be broadly defined as all computing outside the cloud that happens at the edge of a network, and more specifically in applications where real-time processing of data is required. Typically, cloud computing operates on "big" data while edge computing operates on "instant data," which can be real-time data generated by sensors or users. Edge computing is expected to improve response times and save bandwidth.

SUMMARY

Embodiments of the present invention are directed to a computer-implemented method for smart switching. The computer-implemented method includes checking whether an edge device will complete a task relative to a data warehouse while having networking availability, deciding to proceed with the task using an extract, transform, load (ETL) strategy based on a determination that the edge device will complete the task while having the networking availability, checking whether the edge device will complete data extraction of the task while having the networking availability based on a determination that the edge device will not complete the task while having the networking availability and deciding to proceed with the data extraction using an extract, load, transform (ELT) strategy based on a determination that the edge device will complete the data extraction of the task while having the networking availability.

As a result of an execution of the computer-implemented method, the proposed system will evaluate movement patterns and network availabilities pattern of each edge device taking part in a data extraction process. The proposed system will also keep track the task types done by each edge device if and when the data is getting transformed at the edge devices. The proposed system will have a data database of data processing times required for each of the task types in edge devices and the availability patterns of the edge devices established. The proposed system will thus be able to predict ETL and ELT windows of each edge device.

In accordance with additional or alternative embodiments of the invention, the checking of whether the edge device will complete the task relative to the data warehouse while having the networking availability includes predicting ETL/ELT windows for the task, tracking task times, evaluating capabilities of the edge device, monitoring network availability patterns and maintaining for review a database of the ETL/ELT windows, the task times, the capabilities and the network availability patterns.

In accordance with additional or alternative embodiments of the invention, the computer-implemented method further includes instructing a front-end switching device local to the edge device as to the deciding to proceed with the task using the ETL strategy and as to the deciding to proceed with the data extraction using the ELT strategy and instructing a back-end switching device local to the data warehouse as to the deciding to proceed with the task using the ETL strategy and as to the deciding to proceed with the data extraction using the ELT strategy.

In accordance with additional or alternative embodiments of the invention, the computer-implemented method further includes checking whether the using of the ETL strategy can continue partially and then be offloaded to a second edge device while the second edge device has networking availability and deciding to proceed with the using of the ETL strategy and then offloading the processing to the second edge device using the ETL strategy based on a determination that the second edge device will complete the task while having the networking availability.

In accordance with additional or alternative embodiments of the invention, the computer-implemented method further includes at least one of adjusting the network availability of the edge device and adjusting a capability of the edge device to complete the task.

In accordance with additional or alternative embodiments of the invention, the computer-implemented method further includes determining whether the edge device is in a non-critical data schedule window and restricting a switch between the ETL and ELT strategies in accordance with a result of the determining.

Embodiments of the invention further provide computer program products and computer systems having substantially the same features and technical benefits as the above-described computer-implemented methods.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Turning now to an overview of technologies that are more specifically relevant to aspects of the invention, the recent trend of edge computing extends cloud computing and the Internet of Things (IoT) to the edge of the network. Edge computing moves more computational power and resources closer to end users by increasing the number of endpoints and locating them nearer to the consumers, be they users or devices. Fundamentally, edge computing architectures are built on existing technologies and established paradigms for distributed systems, which means that there are many well understood components available to create the most effective architectures to build and deliver edge use cases.

In different contextual situations, there can be different levels of network bandwidth availability. That is, in any application landscape, there can be different types of applications and those different types of applications can communicate with each other through various upstream and downstream relationships. In a general sense, data moves from one application to another application on a scheduled interval through whatever network is available. This data can be extracted on a scheduled basis from various applications using two different primary strategies in most cases. These are: extract, transform, load (ETL) and extract, load, transform (ELT). Both strategies involve data integration methods that transfer data from a source to a data warehouse.

Figure 1:
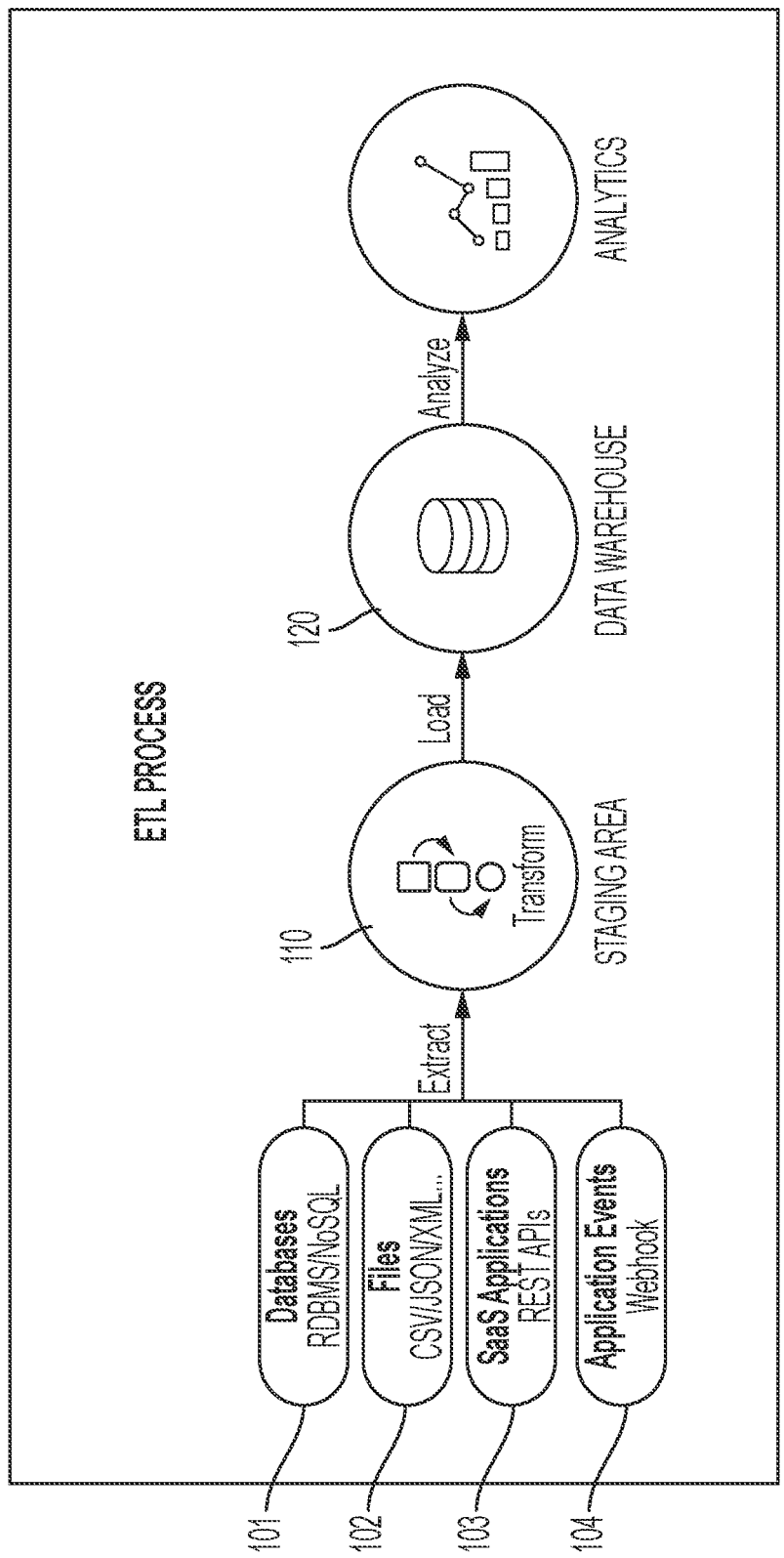
FIG. 1 is a schematic diagram of an extract, transform, load (ETL) strategy for data processing in a system with an edge device in accordance with one or more embodiments of the present invention.

With reference to FIG. 1, ETL is a data integration methodology that extracts raw data from sources such as databases 101, files 102, certain applications 103 and application events 104, transforms the data on a secondary processing server 110 and then loads the data into a target database 120. The data in the target database 120 can be subsequently analyzed by a processing system 130. Thus, in ETL, the data transformations take place prior to the loading process. This makes ETL ideal for computing-intensive transformations, systems with legacy architectures or data workflows that require manipulation before entering a target system, such as erasing personal identifying information (PII).

Figure 2:
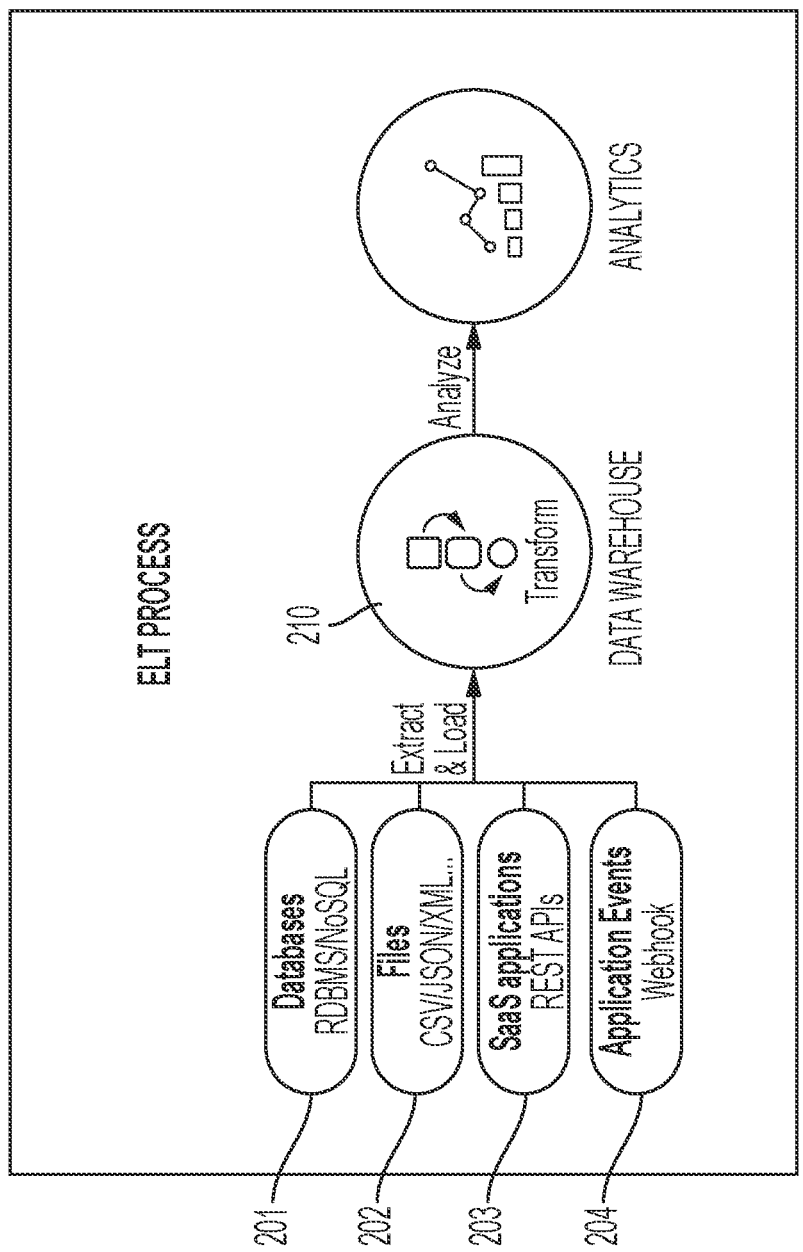
FIG. 2 is a schematic diagram of an extract, load, transform (ELT) strategy for data processing in a system with an edge device in accordance with one or more embodiments of the present invention.

With reference to FIG. 2, ELT is a data integration methodology that extracts raw data from sources such as databases 201, files 202, certain applications 203 and applicants events 204 and loads this raw data into a target database 210. The data is transformed within this target database 210 for subsequent analysis by a processing system 220. Thus, in ELT, data transformations do not take place prior to the loading process, which contrasts ELT with ETL. This makes ELT flexible, efficient and scalable, especially for ingesting large amounts of data, processing data sets that contain both structured and unstructured data and developing diverse business intelligence.

As edge computing systems try to avoid sending unprocessed data over networks (i.e., when edge computing elements take part in both data extraction and transformation processes and then send data to data warehouses), processed data is transmitted from edge computing elements to target warehouses (i.e., servers). This could be categorized as ETL, as only processed or transformed data is loaded the target warehouses. Certain problems can be found in this context. If data processing or data transformation takes time to where edge computing elements lack sufficient network availability to upload the processed or transformed data the target warehouse, storage costs increase in the edge computing elements. Thus, ETL may not be continuously possible in the edge computing elements. On the other hand, if edge computing elements are moved to ELT as a permanent option, then the edge computing elements would be effectively moved away from their primary objective of reducing network traffic. Thus, ELT may also not be continuously possible.

Certain solutions have been proposed for dealing with the various issues associated with ETL and ELT. In some cases, edge computing devices have been moved from one network to another to deal with variabilities in network availability. This, however, comes with risk or reality of losing network access. Another proposal has been to give edge computing devices processing capabilities. This can take time though and afterward the edge computing devices will still need to have access to upload data to the target warehouse.

Turning now to an overview of the aspects of the invention, one or more embodiments of the invention address shortcomings of the above-described approach by providing for a computer-implemented method for smart switching. The computer-implemented method includes checking whether an edge device will complete a task relative to a data warehouse while having networking availability, deciding to proceed with the task using an extract, transform, load (ETL) strategy based on a determination that the edge device will complete the task while having the networking availability, checking whether the edge device will complete data extraction of the task while having the networking availability based on a determination that the edge device will not complete the task while having the networking availability and deciding to proceed with the data extraction using an extract, load, transform (ELT) strategy based on a determination that the edge device will complete the data extraction of the task while having the networking availability.

Figure 3:
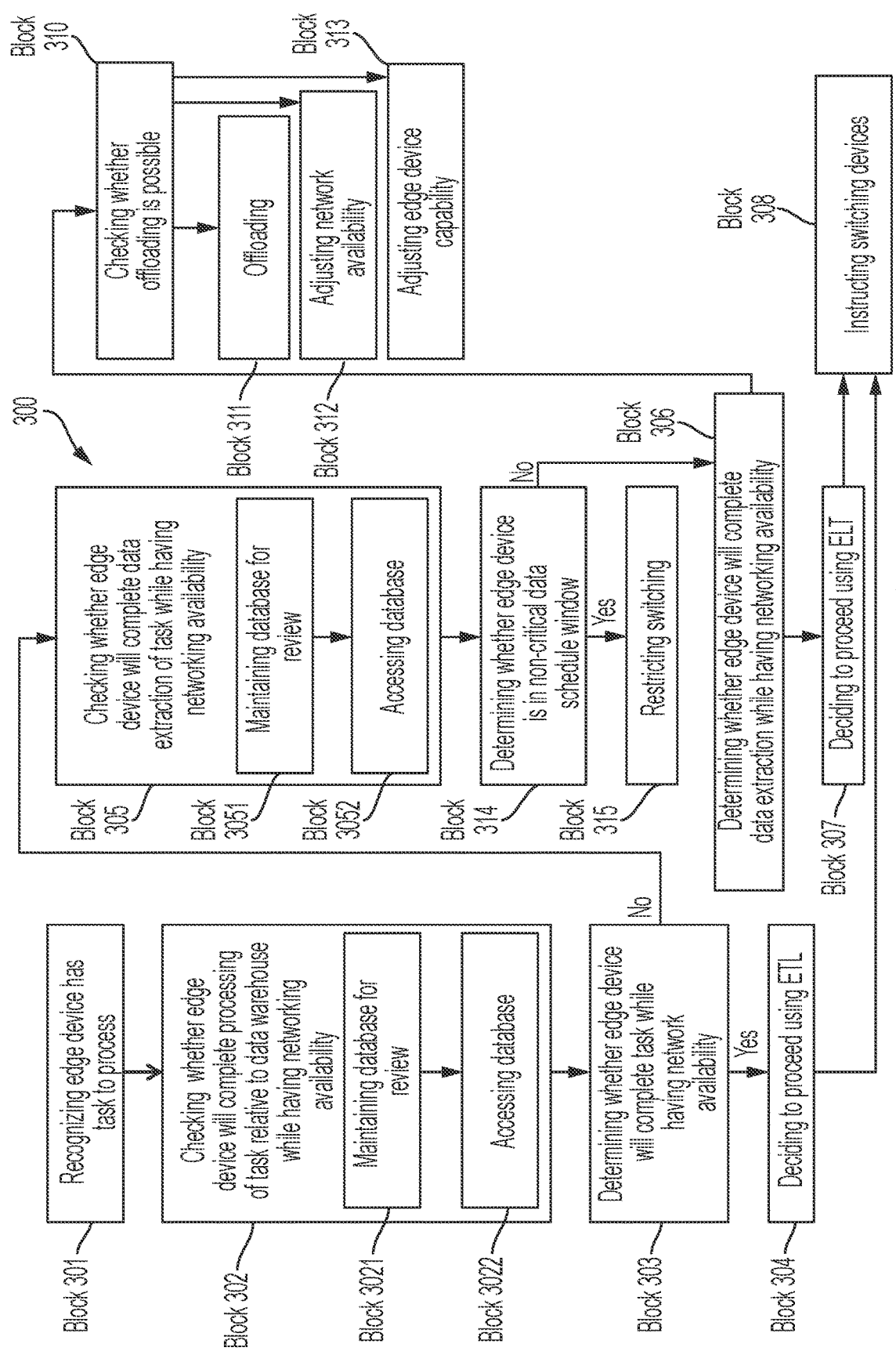
FIG. 3 is a flow diagram illustrating a computer-implemented method for smart switching for data processing in a system with an edge device in accordance with one or more embodiments of the present invention.

The above-described aspects of the invention address the shortcomings of known approaches by providing for a proposed system that will evaluate movement patterns and network availabilities pattern of each edge device taking part in a data extraction process. The proposed system will also keep track the task types done by each edge device if and when the data is getting transformed at the edge devices and will have a data database of data processing times required for each of the task types in edge devices and the availability patterns of the edge devices established. The proposed system will thus be able to predict ETL and ELT windows of each edge device Turning now to a more detailed description of aspects of the present invention, FIG. 3 is a flow diagram illustrating a computer-implemented method 300 for smart switching for data processing in a system with an edge device in accordance with one or more embodiments of the present invention.

The computer-implemented method 300 begins by recognizing that an edge device has a task to process (block 301) and checking whether the edge device will complete the processing of the task relative to a data warehouse while having networking availability (block 302). The checking of block 302 can include maintaining a database for review (block 3021) and accessing the database (block 3022) where the database includes data for predicting ETL/ELT windows for the task, data that is representative of tracked task times for similar types of tasks, data that is representative of evaluated capabilities of the edge device and data that is representative of monitored network availability patterns. The computer-implemented method 300 further includes determining whether the edge device will complete the task while having the networking availability based on results of the checking of block 302 (block 303) and deciding to proceed with the task using an ETL strategy in an event the determining of block 303 indicates that the edge device will complete the task while having the networking availability (block 304). In an event the determining indicates that the edge device will not complete the task while having the networking availability, the computer-implemented method 300 includes checking whether the edge device will complete data extraction of the task while having the networking availability (block 305). As above, the checking of block 305 can include maintaining the database for review (block 3051) and accessing the database (block 3052) where the database can be the same or a similar database as the database described above. The computer-implemented method 300 also includes determining whether the edge device will complete the data extraction while having the networking availability based on the results of the checking of block 305 (block 306) and deciding to proceed with the data extraction using an ELT strategy in an event the determining of block 306 indicates that the edge device will complete the data extraction of the task while having the networking availability (block 307).

In accordance with one or more embodiments of the present invention, the computer-implemented method 300 can also include instructing a front-end switching device, which is local to the edge device, and a back-end switching device, which is local to the data warehouse, as to the deciding to proceed of blocks 304 and 307 (block 308). This can be done in parallel and can result in the front-end and back-end switching devices thus being informed and operated accordingly in concert with one another in some cases.

As an additional or alternative possibility, particularly in an event that the determining of block 306 indicates that the edge device will not complete the data extraction of the task while having the networking availability, the computer-implemented method 300 can further include checking whether the using of the ETL strategy can continue partially and then be offloaded to a second edge device while the second edge device has networking availability (block 310) and deciding to proceed with the using of the ETL strategy and then offloading the processing to the second edge device using the ETL strategy (block 311) in an event the second edge device will complete the task while having the networking availability. Moreover, in an event the second edge device will not complete the task while having the networking availability, the computer-implemented method 300 can also include at least one of adjusting the network availability of the edge device or the second edge device (block 312) to provide either feature with more time for task completion and adjusting a capability of the edge device or the second edge device to complete the task (block 313) in order to increase a likelihood of task completion by either device while either device has networking availability. As such, if a processing time for a task is predicted to be about twenty minutes for an edge device, which is about to lose networking availability, to complete the task, the edge device can continue to use the ETL strategy for task completion if the networking availability can be extended by twenty minutes as required for the task completion. Similarly, if a processing time for a task is predicted to be about twenty-five minutes for an edge device, which will lose networking availability in twenty minutes, the edge device can continue to use the ETL strategy for task completion if the processing capabilities of the edge device can be increased on a temporary basis.

In accordance with one or more embodiments of the present invention, the computer-implemented method 300 can also include determining whether the edge device or the second edge device is in a non-critical data schedule window (block 314) and restricting a switch between the ETL and ELT strategies in accordance with a result of the determining of block 314 (block 315).

Figure 4:
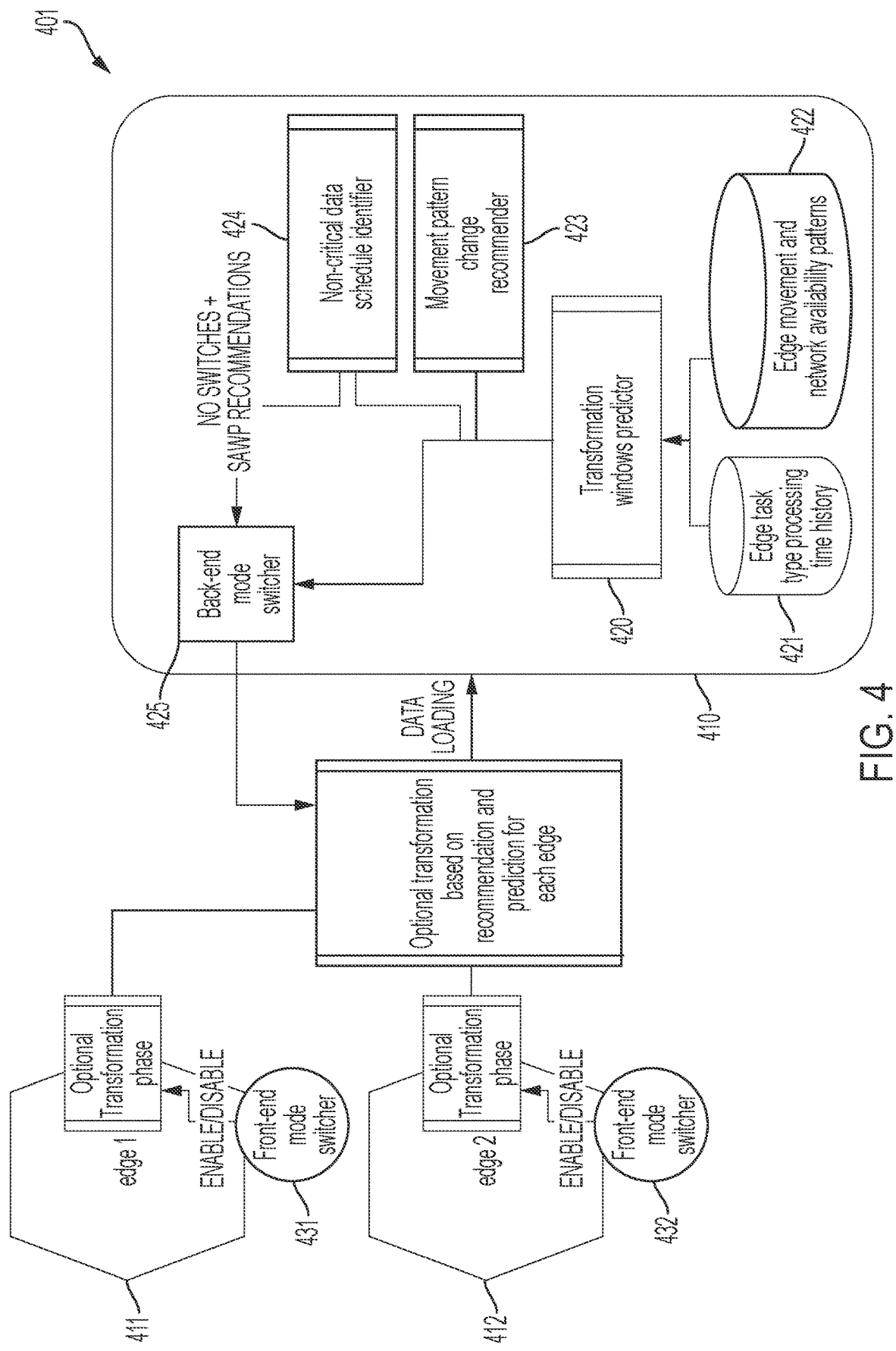
FIG. 4 is a schematic diagram of the system of FIG. 4 in accordance with one or more embodiments of the present invention.
Figure 6:
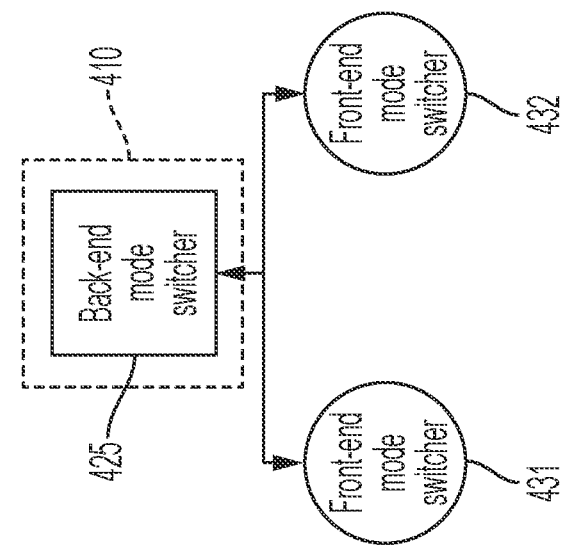
FIG. 6 is a schematic diagram illustrating communications between front-end and back-end switching devices in accordance with one or more embodiments of the present invention.
Figure 5:
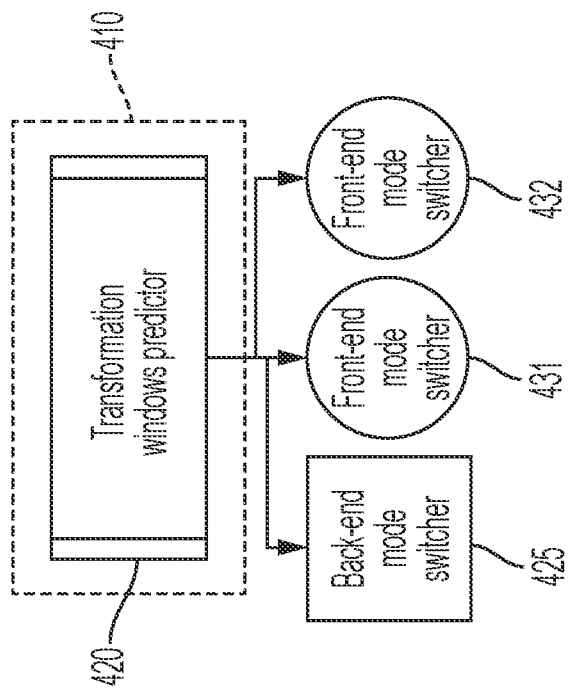
FIG. 5 is a schematic diagram illustrating communications between a transformation windows predictor and front-end and back-end switching devices in accordance with one or more embodiments of the present invention.

With reference to FIGS. 4, 5 and 6, a system 401 that can execute the computer-implemented method 300 of FIG. 3 is provided. As shown in FIG. 4, the system 401 includes a network computing device 410, such as a server, which includes for example the secondary processing server 110 and the target database 120 of FIG. 1. The system 401 further includes a first edge device 411 and a second edge device 412. The network computing device 410 can include a transformation windows predictor 420, which has the primary responsibility for making decision between ETL and ELT strategies, a first database 421 for storing edge task type processing time history data, a second database 422 for storing edge movement and network availability pattern data, a movement pattern change recommender 423 for recommending changes to edge device operations and a non-critical data schedule identifier 424 for identifying when an edge device is engaged in non-critical data operations. The network computing device 410 can also include a back-end mode switcher 425. The first edge device 411 includes a front-end mode switcher 431 and the second edge device 412 includes a front-end mode switcher 432. As shown in FIG. 5, the transformation windows predictor 420 is communicative with each of the front-end mode switcher 431, the front-end mode switcher 432 and the back-end mode switcher 425. As shown in FIG. 6, the front-end mode switcher 431, the front-end mode switcher 432 and the back-end mode switcher 425 are communicative with each other.

An operation of the system 401 will now be described with reference to FIGS. 4, 5 and 6. Initially, the network computing device 410 recognizes that one of the first and second edge devices 411 and 412 (i.e., the first edge device 411 as an example) has a task to process and the transformation windows predictor 420 checks whether the first edge device 411 will complete the processing of the task relative to a data warehouse while having networking availability by reference to the first and second databases 421 and 422. The network computing device 410 will then determine whether the first edge device 411 will complete the task while having the networking availability based on results of the checking and will deciding to proceed with the task using an ETL strategy in an event the first edge device 411 will be predicted to complete the task while having the networking availability. The network computing device 410 will then inform the front-end mode switcher 431, the front-end mode switcher 432 and the back-end mode switcher 425 as to the decision to proceed with the ETL strategy and the first edge device 411 will continue in that manner.

In an event the determining indicates that the first edge device 411 will not complete the task while having the networking availability, the network computing device 410 will check whether the first edge device 411 will complete data extraction of the task while having the networking availability by again referring to the first and second databases 411 and 412. The network computing device 410 will then determine whether the first edge device 411 will complete the data extraction while having the networking availability based on the results of the checking and will decide to proceed with the data extraction using an ELT strategy in an event the first edge device 411 will complete the data extraction of the task while having the networking availability if the first edge device 411 is not in a non-critical data schedule by reference to the non-critical data schedule identifier 424. If the first edge device 411 is not within a non-critical data window, the network computing device 410 will then inform the front-end mode switcher 431, the front-end mode switcher 432 and the back-end mode switcher 425 as to the decision to proceed with the ELT strategy and the first edge device 411 will continue in that manner once the switching by the front-end mode switch 431 executes the switch to ELT. If the first edge device 411 is within a non-critical data window, the switch to the ELT strategy can be restricted or prevented.

In an event that the first edge device 411 will not complete the data extraction of the task while having the networking availability, the network computing device will check whether the using of the ETL strategy can continue partially and then be offloaded to the second edge device 412 while the second edge device has networking availability. The network computing device 410 will then decide to proceed in that manner with the using of the ETL strategy and then offloading the processing to the second edge device 412 using the ETL strategy in an event the second edge device 412 will complete the task while having the networking availability. In an event the second edge device 412 will not complete the task while having the networking availability, the network computing device 410 will determine whether to adjust the network availability of the first edge device 411 or the second edge device 412 and/or will determine whether to adjust a capability of the first edge device 411 or the second edge device 412 by referring to the movement pattern change recommender.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 7:
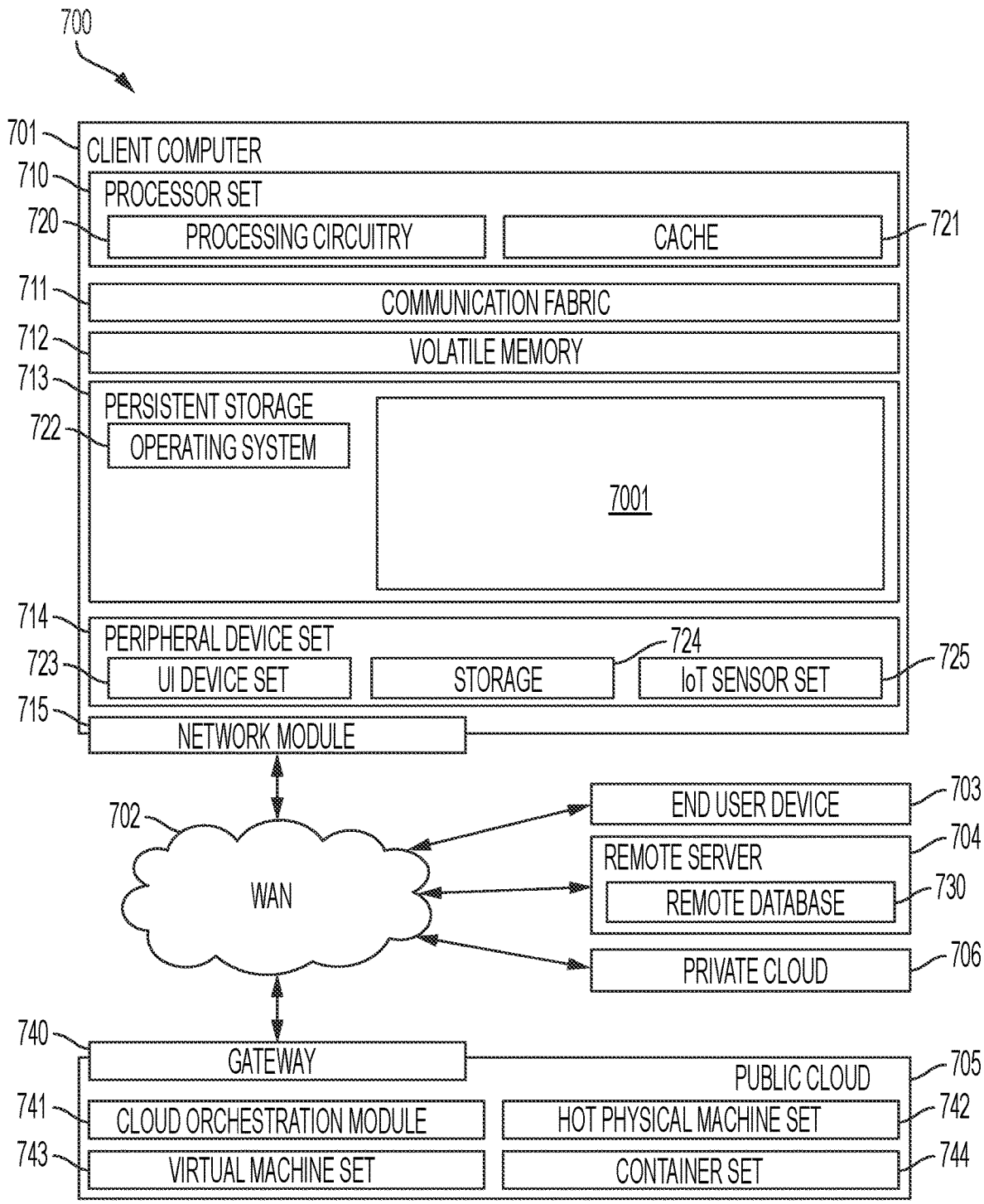
FIG. 7 is a schematic diagram of a computing environment for executing the computer-implemented method of FIG. 3 in accordance with one or more embodiments of the present invention.

With reference to FIG. 7, a computer or computing device 700 that implements the computer-implemented method 300 of FIG. 3 in accordance with one or more embodiments of the present invention is provided. The computer or computing device 700 of FIG. 7 contains an example of an environment for the execution of at least some of the computer code involved in performing the inventive methods, such as the block 7001 of the computer-implemented method 300 of FIG. 3 for processing data connection requests. In addition to the computer-implemented method 300 of block 7001, the computer or computing device 700 includes, for example, computer 701, wide area network (WAN) 702, end user device (EUD) 703, remote server 704, public cloud 705, and private cloud 706. In this embodiment, computer 701 includes processor set 710 (including processing circuitry 720 and cache 721), communication fabric 711, volatile memory 712, persistent storage 713 (including operating system 722 and the computer-implemented method 300 of block 7001, as identified above), peripheral device set 714 (including user interface (UI) device set 723, storage 724, and Internet of Things (IoT) sensor set 725), and network module 715. Remote server 704 includes remote database 730. Public cloud 705 includes gateway 740, cloud orchestration module 741, host physical machine set 742, virtual machine set 743, and container set 744.

The computer 701 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 730. As is well understood in the art of computer technology, and depending upon the technology, performance of a computer-implemented method may be distributed among multiple computers and/or between multiple locations. On the other hand, in this presentation of the computer-implemented method 900, detailed discussion is focused on a single computer, specifically computer 701, to keep the presentation as simple as possible. Computer 701 may be located in a cloud, even though it is not shown in a cloud in FIG. 7. On the other hand, computer 701 is not required to be in a cloud except to any extent as may be affirmatively indicated.

The processor set 710 includes one, or more, computer processors of any type now known or to be developed in the future. Processing circuitry 720 may be distributed over multiple packages, for example, multiple, coordinated integrated circuit chips. Processing circuitry 720 may implement multiple processor threads and/or multiple processor cores. Cache 721 is memory that is located in the processor chip package(s) and is typically used for data or code that should be available for rapid access by the threads or cores running on processor set 710. Cache memories are typically organized into multiple levels depending upon relative proximity to the processing circuitry. Alternatively, some, or all, of the cache for the processor set may be located "off chip." In some computing environments, processor set 710 may be designed for working with qubits and performing quantum computing.

Computer readable program instructions are typically loaded onto computer 701 to cause a series of operational steps to be performed by processor set 710 of computer 701 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 721 and the other storage media discussed below. The program instructions, and associated data, are accessed by processor set 710 to control and direct performance of the inventive methods. In the computer-implemented method 900, at least some of the instructions for performing the inventive methods may be stored in the block 200 of the computer-implemented method 900 in persistent storage 713.

Communication fabric 711 is the signal conduction path that allows the various components of computer 701 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 712 is any type of volatile memory now known or to be developed in the future. Examples include dynamic type random access memory (RAM) or static type RAM. Typically, volatile memory 712 is characterized by random access, but this is not required unless affirmatively indicated. In computer 701, the volatile memory 712 is located in a single package and is internal to computer 701, but, alternatively or additionally, the volatile memory may be distributed over multiple packages and/or located externally with respect to computer 701.

Persistent storage 713 is any form of non-volatile storage for computers that is now known or to be developed in the future. The non-volatility of this storage means that the stored data is maintained regardless of whether power is being supplied to computer 701 and/or directly to persistent storage 713. Persistent storage 713 may be a read only memory (ROM), but typically at least a portion of the persistent storage allows writing of data, deletion of data and re-writing of data. Some familiar forms of persistent storage include magnetic disks and solid state storage devices. Operating system 722 may take several forms, such as various known proprietary operating systems or open source Portable Operating System Interface-type operating systems that employ a kernel. The code included in the block 200 of the computer-implemented method 900 typically includes at least some of the computer code involved in performing the inventive methods.

Peripheral device set 714 includes the set of peripheral devices of computer 701. Data communication connections between the peripheral devices and the other components of computer 701 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 723 may include components such as a display screen, speaker, microphone, wearable devices (such as goggles and smart watches), keyboard, mouse, printer, touchpad, game controllers, and haptic devices. Storage 724 is external storage, such as an external hard drive, or insertable storage, such as an SD card. Storage 724 may be persistent and/or volatile. In some embodiments, storage 724 may take the form of a quantum computing storage device for storing data in the form of qubits. In embodiments where computer 701 is required to have a large amount of storage (for example, where computer 701 locally stores and manages a large database) then this storage may be provided by peripheral storage devices designed for storing very large amounts of data, such as a storage area network (SAN) that is shared by multiple, geographically distributed computers. IoT sensor set 725 is made up of sensors that can be used in Internet of Things applications. For example, one sensor may be a thermometer and another sensor may be a motion detector.

Network module 715 is the collection of computer software, hardware, and firmware that allows computer 701 to communicate with other computers through WAN 702. Network module 715 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 715 are performed on the same physical hardware device. In other embodiments (for example, embodiments that utilize software-defined networking (SDN)), the control functions and the forwarding functions of network module 715 are performed on physically separate devices, such that the control functions manage several different network hardware devices. Computer readable program instructions for performing the inventive methods can typically be downloaded to computer 701 from an external computer or external storage device through a network adapter card or network interface included in network module 715.

WAN 702 is any wide area network (for example, the internet) capable of communicating computer data over non-local distances by any technology for communicating computer data, now known or to be developed in the future. In some embodiments, the WAN 702 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 703 is any computer system that is used and controlled by an end user (for example, a customer of an enterprise that operates computer 701), and may take any of the forms discussed above in connection with computer 701. EUD 703 typically receives helpful and useful data from the operations of computer 701. For example, in a hypothetical case where computer 701 is designed to provide a recommendation to an end user, this recommendation would typically be communicated from network module 715 of computer 701 through WAN 702 to EUD 703. In this way, EUD 703 can display, or otherwise present, the recommendation to an end user. In some embodiments, EUD 703 may be a client device, such as thin client, heavy client, mainframe computer, desktop computer and so on.

Remote server 704 is any computer system that serves at least some data and/or functionality to computer 701. Remote server 704 may be controlled and used by the same entity that operates computer 701. Remote server 704 represents the machine(s) that collect and store helpful and useful data for use by other computers, such as computer 701. For example, in a hypothetical case where computer 701 is designed and programmed to provide a recommendation based on historical data, then this historical data may be provided to computer 701 from remote database 730 of remote server 704.

Public cloud 705 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 705 is performed by the computer hardware and/or software of cloud orchestration module 741. The computing resources provided by public cloud 705 are typically implemented by virtual computing environments that run on various computers making up the computers of host physical machine set 742, which is the universe of physical computers in and/or available to public cloud 705. The virtual computing environments (VCEs) typically take the form of virtual machines from virtual machine set 743 and/or containers from container set 744. It is understood that these VCEs may be stored as images and may be transferred among and between the various physical machine hosts, either as images or after instantiation of the VCE. Cloud orchestration module 741 manages the transfer and storage of images, deploys new instantiations of VCEs and manages active instantiations of VCE deployments. Gateway 740 is the collection of computer software, hardware, and firmware that allows public cloud 705 to communicate through WAN 702.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 706 is similar to public cloud 705, except that the computing resources are only available for use by a single enterprise. While private cloud 706 is depicted as being in communication with WAN 702, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 705 and private cloud 706 are both part of a larger hybrid cloud.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for smart switching, the computer-implemented method comprising:
    disposing a front-end switching device local to an edge device and disposing a back-end switching device local to a data warehouse of a network computing device;
    arranging a transformation windows predictor in communication with the front-end and the back-end switching devices;
    checking, at the transformation windows predictor, whether an edge device will complete a task relative to the data warehouse while having networking availability;
    based on a determination that the edge device will complete the task while having the networking availability:
        deciding, at the network computing device, to proceed with the task using an extract, transform, load (ETL) strategy;
        instructing the front-end and the back-end switching devices as to the deciding to execute the task using the ETL strategy by the network computing device;
    based on a determination that the edge device will not complete the task while having the networking availability, checking, at the transformation windows predictor, whether the edge device will complete data extraction of the task while having the networking availability;
    based on a determination that the edge device will complete the data extraction of the task while having the networking availability:
        deciding, at the network computing device, to proceed with the data extraction using an extract, load, transform (ELT) strategy; and
        instructing the front-end and the back-end switching devices as to the deciding to execute the task using the ELT strategy by the network computing device.

2. The computer-implemented method according to claim 1, wherein the checking of whether the edge device will complete the task relative to the data warehouse while having the networking availability comprises:
    predicting ETL/ELT windows for the task;
    tracking task times;
    evaluating capabilities of the edge device;
    monitoring network availability patterns; and
    maintaining for review a database of the ETL/ELT windows, the task times, the capabilities and the network availability patterns.

3. The computer-implemented method according to claim 1, further comprising:
    checking whether the using of the ETL strategy can continue partially and be offloaded to a second edge device while the second edge device has networking availability; and
    deciding to proceed with the using of the ETL strategy and offloading the processing to the second edge device using the ETL strategy based on a determination that the second edge device will complete the task while having the networking availability.

4. The computer-implemented method according to claim 1, further comprising adjusting the network availability of the edge device.

5. The computer-implemented method according to claim 1, further comprising adjusting a capability of the edge device to complete the task.

6. The computer-implemented method according to claim 1, further comprising:
    determining whether the edge device is in a non-critical data schedule window; and
    restricting a switch between the ETL and ELT strategies in accordance with a result of the determining.

7. A computer program product for smart switching, the computer program product comprising one or more computer readable storage media having computer readable program code collectively stored on the one or more computer readable storage media, the computer readable program code being executed by a processor of a computer system to cause the computer system to perform a method comprising:
    disposing a front-end switching device local to an edge device and disposing a back-end switching device local to a data warehouse of a network computing device;
    arranging a transformation windows predictor in communication with the front-end and the back-end switching devices;
    checking, at the transformation windows predictor, whether an edge device will complete a task relative to the data warehouse while having networking availability;
    based on a determination that the edge device will complete the task while having the networking availability:
        deciding, at the network computing device, to proceed with the task using an extract, transform, load (ETL) strategy;
        instructing the front-end and the back-end switching devices as to the deciding to execute the task using the ETL strategy by the network computing device;
    based on a determination that the edge device will not complete the task while having the networking availability, checking, at the transformation windows predictor, whether the edge device will complete data extraction of the task while having the networking availability;
    based on a determination that the edge device will complete the data extraction of the task while having the networking availability:
        deciding, at the network computing device, to proceed with the data extraction using an extract, load, transform (ELT) strategy; and
        instructing the front-end and the back-end switching devices as to the deciding to execute the task using the ELT strategy by the network computing device.

8. The computer program product according to claim 7, wherein the checking of whether the edge device will complete the task relative to the data warehouse while having the networking availability comprises:
    predicting ETL/ELT windows for the task;
    tracking task times;
    evaluating capabilities of the edge device;
    monitoring network availability patterns; and maintaining for review a database of the ETL/ELT windows, the task times, the capabilities and the network availability patterns.

9. The computer program product according to claim 7, wherein the method further comprises:
checking whether the using of the ETL strategy can continue partially and then be offloaded to a second edge device while the second edge device has networking availability; and
deciding to proceed with the using of the ETL strategy and then offloading the processing to the second edge device using the ETL strategy based on a determination that the second edge device will complete the task while having the networking availability.

10. The computer program product according to claim 7, wherein the method further comprises adjusting the network availability of the edge device.

11. The computer program product according to claim 7, wherein the method further comprises adjusting a capability of the edge device to complete the task.

12. The computer program product according to claim 7, wherein the method further comprises:
determining whether the edge device is in a non-critical data schedule window; and
restricting a switch between the ETL and ELT strategies in accordance with a result of the determining.

13. A computing system comprising: a processor; a memory coupled to the processor; and one or more computer readable storage media coupled to the processor, the one or more computer readable storage media collectively containing instructions that are executed by the processor via the memory to implement a method for smart switching comprising:
disposing a front-end switching device local to an edge device and disposing a back-end switching device local to a data warehouse of a network computing device;
arranging a transformation windows predictor in communication with the front-end and the back-end switching devices;
checking, at the transformation windows predictor, whether an edge device will complete a task relative to the data warehouse while having networking availability;
based on a determination that the edge device will complete the task while having the networking availability:
deciding, at the network computing device, to proceed with the task using an extract, transform, load (ETL) strategy;
instructing the front-end and the back-end switching devices as to the deciding to execute the task using the ETL strategy by the network computing device;
based on a determination that the edge device will not complete the task while having the networking availability, checking, at the transformation windows predictor, whether the edge device will complete data extraction of the task while having the networking availability;
based on a determination that the edge device will complete the data extraction of the task while having the networking availability:
deciding, at the network computing device, to proceed with the data extraction using an extract, load, transform (ELT) strategy; and
instructing the front-end and the back-end switching devices as to the deciding to execute the task using the ELT strategy by the network computing device.

14. The computing system according to claim 13, wherein the checking of whether the edge device will complete the task relative to the data warehouse while having the networking availability comprises:
predicting ETL/ELT windows for the task;
tracking task times;
evaluating capabilities of the edge device;
monitoring network availability patterns; and
maintaining for review a database of the ETL/ELT windows, the task times, the capabilities and the network availability patterns.

15. The computing system according to claim 13, wherein the method further comprises:
checking whether the using of the ETL strategy can continue partially and then be offloaded to a second edge device while the second edge device has networking availability; and
deciding to proceed with the using of the ETL strategy and then offloading the processing to the second edge device using the ETL strategy based on a determination that the second edge device will complete the task while having the networking availability.

16. The computing system according to claim 13, wherein the method further comprises at least one of adjusting the network availability of the edge device and adjusting a capability of the edge device to complete the task.

17. The computing system according to claim 13, wherein the method further comprises:
determining whether the edge device is in a non-critical data schedule window; and
restricting a switch between the ETL and ELT strategies in accordance with a result of the determining.

* * * * *